United States Patent [19]

Ashman et al.

[11] 4,100,076
[45] Jul. 11, 1978

[54] TITANATE TREATED ANTIMONY COMPOUNDS

[75] Inventors: John Slocum Ashman, Euclid; Gerald Dennis Burt, Shaker Heights; Anton Mudrak, Broadview Heights, all of Ohio

[73] Assignee: The Harshaw Chemical Company, Cleveland, Ohio

[21] Appl. No.: 809,227

[22] Filed: Jun. 23, 1977

[51] Int. Cl.² ............................................. C09K 3/28
[52] U.S. Cl. .............................. 252/8.1; 260/45.75 B; 260/45.75 F; 260/DIG. 24
[58] Field of Search ................ 252/8.1; 260/45.75 B, 260/45.75 F, DIG. 24

[56] References Cited

U.S. PATENT DOCUMENTS 3,766,065  10/1973  Chay et al. ............................. 252/8.1

FOREIGN PATENT DOCUMENTS 721,586  1/1955  United Kingdom .................. 252/8.1

*Primary Examiner*—Leland A. Sebastian

*Attorney, Agent, or Firm*—Armand P. Boisselle

[57] ABSTRACT

Finely divided particulate inorganic antimony compounds which are surface modified with an organic titanium compound having the formula

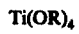

wherein each R is independently an alkyl, aryl, cycloalkyl, or vinyl group containing from one to about 18 carbon atoms, or

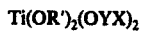

wherein X is oxygen or nitrogen, Y is a two- or three-carbon atom chain, and R' is equal to R, H or the ligand represented by XYOH are described. These surface modified antimony compounds may be incorporated into various organic resin and elastomer systems to improve the flame-retardant properties of these materials.

13 Claims, No Drawings

TITANATE TREATED ANTIMONY COMPOUNDS

BACKGROUND OF THE INVENTION

This invention relates to finely divided particulate inorganic antimony compounds, and more particularly, to antimony oxides and sulfides which are surface modified with an organic titanate compound.

Organic resins and elastomers have been used for a wide variety of purposes. However, many synthetic resins and elastomers generally are flammable, and the use of these materials presents certain problems and dangers. Efforts have been made to improve the flame-retardant and smoke-retardant properties of synthetic resins and elastomers, and such efforts have increased in recent years.

Some suggestions for improving the flame-retardant properties of resins and elastomers involved modification of the polymers themselves such as by introducing the monomeric material into the polymer mixture which should reduce the flammability of the product. For example, it has been known that the flammability and burning properties of polyacrylonitrile can be reduced by copolymerising acrylonitrile with halogen-containing comonomers such as, for example, vinyl or vinylidene chloride. It also has been suggested to incorporate certain flame-retardant additives into resins and elastomers, and various halogen-containing organic compounds have been shown to be effective as flame retardants.

A number of antimony compounds have been used as flame retardants in combination with other flame retardants for various organic resins and elastomers. One commonly used compound is antimony trioxide. One of the difficulties associated with the use of antimony compounds such as antimony oxides and antimony sulfides to improve the flame-retardant properties of flammable organic resins and elastomers is the degradation of some of the other desirable properties of the treated elastomers and resins. Although the incorporation of small amounts of antimony oxides and antimony sulfides in conjunction with organic flame-retardant compounds in flammable resins and elastomers generally improves the flame-retardant properties of the resulting product, the incorporation of such antimony compounds often has an adverse effect on other properties of the resins and elastomers such as flexural strength, impact strength, tensile strength, flexural modulus and hardness.

The above-described adverse effects are not limited to the antimony oxides and sulfides. The literature describes procedures for filling thermoplastic and other polymers with many inorganic oxides, primarily as fillers. Examples of inorganic oxides which have been used as fillers for resins and elastomers include aluminum oxide, zinc oxide, iron oxide, magnesium oxide, titanium dioxide, silicates such as kaolin clay, mica, calcium silicate and aluminum silicate, calcium carbonate such as limestone, etc. In the initial development of this art, the inorganic oxide materials, in particulate form, were introduced and blended into resins and elastomers. The resulting mixtures were molded by conventional methods such as casting, injection molding, extrusion or rotational molding to form inorganic oxide reinforced plastic articles. However, it generally was found that the properties of such filled articles were not as good as expected or desired.

Various suggestions have been made in the literature for improving the results obtained when such inorganic oxide materials are incorporated into resins and elastomers. A number of suggestions for overcoming these problems have involved the use of silicon-containing compounds, and particularly silane coupling agents.

U.S. Pat. No. 3,641,087 describes the use of brominated silane derivatives in combination with metal oxides such as antimony oxides and organic antimonates as flame-retardant additives for synthetic polymer compositions. The separate addition of metal oxides such as antimony oxide and other additives such as silanes and diallyl chlorendates to diallylic phthalate resins is described in U.S. Pat. 3,483,158. Such compositions are reported to be flame retardant.

U.S. Pat. No. 3,793,288 suggests that the bonding relationship between polymers and inorganic fillers may be improved by treating the polymer rather than by treatment of the fillers. Accordingly, U.S. Pat. No. 3,793,288 applies a surface on thermoplastic polymers which comprises an organo-functional silane coupling agent and a copolymer of ethylene and acrylic acid and/or methacrylic acid.

A monoalkoxy titanate coupling agent, isopropyl, 4-aminobenzenesulfonyl-di(dodecylbenzenesulfonyl) titanate has been suggested as being useful to reduce the extractability of antimony oxide and Dechlorane (a halogen-containing flame retardant) when incorporated into certain resins. It has been suggested that the improved bonding results at least in part from the interaction of the amine group of the titanate with the halogen-containing compound.

Considerable effort has been devoted to improving the flame-retardant properties of resins and elastomers in recent years, and the above-discussed prior art merely is exemplary of these efforts.

SUMMARY OF THE INVENTION

This invention relates to inorganic antimony compounds which have been surface modified with organic titanates and to the use of these surface modified antimony compounds for improving the flame-retardant properties of various resins and elastomers while minimizing the usual adverse effects on other properties. The surface modified antimony compounds of this invention comprise particulate inorganic antimony compounds which have been treated with an organic titanate having the formula $$Ti(OR)_4 \qquad \text{(FORMULA I)}$$

wherein each R is independently an alkyl, aryl, cycloalkyl, or vinyl group containing from one to about 18 carbon atoms, or $$Ti(OR\pi)_2(OYX)_2 \qquad \text{(FORMULA II)}$$

wherein X is oxygen or nitrogen,

Y is a two- or three-carbon atom chain, and

R' is equal to R, H or the ligand represented by XYOH.

The improvement in the flame-retardant and other properties of resins and elastomers is obtained by the method which comprises incorporating the above-described surface modified antimony compound into the resin or elastomer in an amount which is effective to provide the desired flame-retardant properties. The use of the surface modified antimony compounds of this invention provides the desired improvement in flame-retardant properties while minimizing many of the adverse effects on some properties of the resulting product which otherwise may result from the use of the antimony compounds which are not surface modified in accordance with the invention.

DESCRIPTION OF THE PREFERRED EMBODIMENTS

The antimony compounds which are treated in accordance with the invention are antimony oxides and sulfides. The antimony oxide compounds which may be modified in accordance with this invention include antimony oxides such as antimony trioxide, antimony pentoxide, antimony tetroxide, antimony oxychlorides and metal antimonates such as hydrated potassium antimonate and sodium antimonate. Special pre-treatments of these antimony compounds is not required although it is preferred that the particulate antimony compounds be of suitable particle size range for incorporation into resins and elastomers in a normal manner. The presence of moisture on the surface of the particles is not detrimental and, in fact, may be preferred. Thus, hydrated antimony oxides are contemplated as being useful in the invention.

The organic titanates which may be used to surface modify the inorganic antimony compounds may be titanates having the following general formula $Ti(OR)_4$ (FORMULA I)

wherein each R is independently an alkyl, aryl, cycloalkyl, or vinyl group containing from 1 to about 18 carbon atoms, and may contain other substituents such as halogen, hydroxy, amino and aminoalkyl groups. The aryl groups also may contain substituents such as alkyl hydroxy, halogen amino groups, etc.

Examples of R groups which may be present in the titanates of formula I include methyl, ethyl, n-propyl, iso-propyl, n-butyl, 2-ethyl hexyl, n-nonyl, cetyl, stearyl, cresyl, vinyl, 2-chloroethyl and N-aminoethylaminoethyl. Specific examples of organic titanates useful in this invention include tetramethyl titanate, tetraisopropyl titanate, tetrabutyl titanate, tetranonyl titanate, tetrakis (2-ethylhexyl) titanate, tetrastearyl titanate, tetracresyl titanate, tributyl oleyl titanate, isopropyl tricumylphenyl titanate, isopropyl tri(methoxyphenyl) titanate, etc.

The organic titanate useful in this invention also may be titanium compounds derived from alcohols capable of chelating with titanium and these are represented by the general formula $Ti(OR')_2(OYX)_2$ (FORMULA II)

wherein X is oxygen or nitrogen, Y is a two- or three-carbon atom chain, and R' is equal to R, H, or the ligand represented by XYOH. Because titanium has a valence of 4 and a coordination number of 6, it is possible to form chelated esters by coordinate bonding between titanium and electron-donating groups such as oxygen or nitrogen. In the above formula II, the electron-donating atom is represented as X. Y either is a two- or three-carbon atom chain which permits the formation of an unstrained five or six membered ring. The two- or three-carbon atom chain may be substituted with alkyl groups, and, thus, Y may contain up to about ten carbon atoms.

The titanium chelates useful in this invention are known in the art and some of the chelates can be prepared in aqueous systems such as titanium oxalate, titanium glycolate and glyceryl titanate. Chelates also have been prepared in nonaqueous media. The chelates of the invention also can be prepared quite readily by mixing two moles of a ligand with one mole of a tetraalkyl titanate since the hydroxyl groups of the ligand replace two alkoxy groups of the alkyl titanate. Examples of such chelates include those formed by glycols such as 2-ethyl1,3-hexanediol; by diketones such as acetyl acetone, by hydroxy acids such as lactic, citric and tartaric acids; by ketoesters such as aceto-acetic ester, and by amino alcohols such as by diethanolamine and triethanolamine. Generally, the titanium chelates are not pure chemical compounds but are partially polymerized by intermolecular alcoholysis. The following chelates are examples of commercially available materials:

Tetraoctylene glycol titanate represented by the general formula $Ti(OYOH)_4$ wherein Y equals $-CH_2CH(C_2H_5)CH(C_3H_7)-$;

Diisopropyl di-triethanolamine) titanate; and

Diisopropyl di-(acetyl acetone) titanate.

The surface modified antimony compounds of this invention can be prepared by dissolving the desired amount of titanate or mixture of titanates in a suitable solvent and thereafter blending the antimony compound with the dissolved titanate. Alcohols such as methanol and isopropanol are useful as solvents. Alternatively, the titanate may be mixed with water or a water:alcohol mixture which is then blended with the antimony compound. Halogenated solvents such as chloroform also can be used. Another method for accomplishing the surface modification of the antimony compounds is to intimately mix the desired amount of titanate with the antimony compound in the absence of added solvents. The amount of titanate added to the antimony compounds can be varied but generally will be no more than about 10% by weight based on the weight of the antimony compound. When water or solvent is utilized to facilitate the coating of the antimony compounds, the product is subjected to a drying cycle to remove the water and/or solvent. Drying times of up to about four or five hours at temperatures of about 120°-130° C. have provided satisfactory results.

The following examples illustrate some typical methods for preparing particulate inorganic antimony compounds which are surface active modified with an organic titanium compound in accordance with the method of the invention. Unless otherwise indicated, all parts and percentages are by weight.

EXAMPLE 1

A solution of 15 grams of tetraisopropyl titanate in about 25 ml. of isopropanol is added over a period of about one hour to 300 grams of vigorously stirred antimony trioxide in a reaction flask. After blending is completed the powder is rolled on a roll mill for one hour. The product obtained in this manner is dried at 120° C. for about 4 hours and screened through a 325 mesh screen.

EXAMPLE 2

The procedure of Example 1 is repeated except that the titanate used in this example is "TYZOR" TE which is commercially available from E. I. DuPont de Nemours and Company, Inc., Wilmington, Delaware. This titanium compound is a titanium chelate which is principally diisopropyl di-triethanolamine titanate, and methanol is used in place of the isopropanol.

EXAMPLE 3

The procedure of Example 2 is repeated except that the titanate used is "TYZOR" OG which is principally tetraoctylene glycol titanate available from DuPont.

EXAMPLE 4

The procedure of Example 1 is repeated except that the titanium compound used in this example is "TYZOR" LA available from DuPont and which principally is the ammonium salt of dihydroxy titanium lactate, and 30 grams of this commercially available 50% aqueous solution is used.

EXAMPLE 5

To 297 grams of antimony trioxide contained in a Waring Blender is added three grams of isopropyl, tri-cumylphenyl titanate available from Kenrich Petrochemicals, Inc. under the trade designation "KEN-REACT TTP-34S" over a period of about 3 minutes. The resulting mixture is blended for an additional 15 minutes to give the desired product.

EXAMPLE 6

To 285 grams of antimony pentoxide in a Waring Blender is added 15 grams of "TYZOR" OG over a period of about 5 minutes. The resulting mixture is blended for an additional ten minutes and the product is screened through a 325 mesh screen.

EXAMPLE 7

To 300 grams of antimony trioxide in a Waring Blender is added 15 grams of isopropyl tri (N-aminoethylaminoethyl) titanate dissolved in 20 ml. of chloroform over a period of ten minutes. The mixture was blended for an additional 1.5 hour and transferred to a roll mill and rolled for one hour. The product was screened through a 325 mesh screen.

EXAMPLE 8

A mixture of 15 grams of tetrastearyl titanate in 25 ml. of chloroform is added to 300 grams of antimony trioxide in a Waring Blender over a period of about 10 minutes. The mixture was stirred slowly until the chloroform evaporates. Any lumps are broken up with a spatula, and the mixture is stirred an additional three hours whereupon the mixture is heated at 150° C. After rolling on a roll mill for 1 hour, the product is screened through a 325 mesh screen.

EXAMPLE 9

The procedure of Example 8 is repeated except that 15 grams of tetrakis (2-ethylhexyl) titanate is used in this example in lieu of the tetrastearyl titanate.

EXAMPLE 10

To 300 grams of antimony trioxide in a Waring Blender is added 15 grams of diisopropyl, titanium acetyl acetonate (available from DuPont under the general trade designation "TYZOR" AA) over a period of five minutes with stirring. The speed is gradually increased to full speed over a period of one-half hour followed by an additional 15 minutes of stirring. After 1 hour on the roll mill, the product is screened through a 325 mesh screen.

EXAMPLE 11

The procedure of Example 1 is repeated except the antimony compound used in this example is antimony trisulfide.

EXAMPLE 12

The procedure of Example 1 is repeated except that the antimony compound used in this example is antimony oxychloride.

EXAMPLE 13

The procedure of Example 1 is repeated except that the titanate used is tetrachloroethyl titanate.

The surface-modified antimony compounds of this invention are particularly useful as additives to organic resins and elastomers for improving the flame-retardant properties of these materials when utilized in combination with known organic flame-retardant compositions. The use of combinations of organic flame-retardant compositions with inorganic antimony compounds such as antimony oxides and sulfides to improve the flame-retardant properties of resins and elastomers is known but, as mentioned above, the incorporation of antimony oxide or antimony sulfide generally has adverse effects on a number of the other desirable properties of the resins and elastomers such as strength, hardness, elongation, etc. It now has been found that the particulate inorganic antimony compounds which have been treated with the titanates in accordance with the invention improve the flame-retardant properties of these resins and elastomers, and further, provide these desirable results while minimizing or overcoming the normal adverse effects of such antimony compounds.

The surface-modified antimony compounds of the invention can be used in a wide variety of organic resins and elastomers. Examples of thermosetting resins which can be treated with the antimony compounds of the invention include: phenolic resins, alkyd resins, epoxy resins polybutadiene resins, polyester resins, crosslinked polyethylene resins, urethanes and polyimides resins. Examples of thermoplastic resins include: polyamides, ABS polycarbonates, polyesters, polyethylenes, polypropylenes, polystyrene and polyvinyl chlorides. A number of elastomeric materials can be treated with the surface-modified antimony compounds and these include: neoprene, nitriles, polybutadienes, polyisoprenes, polysulfides, SBR, and urethanes.

The surface-modified antimony compounds of this invention can be incorporated into the above resins and elastomers at any suitable stage in the manufacture of the polymer composition. Thus, the antimony compounds may be added to a monomer prior to polymerization or, as may often be more convenient, to an already formed polymer. Other conventional constituents of polymer compositions such as fillers, plasticizers, pigments and stabilizers also may be incorporated in amounts which are well known to those skilled in the art to provide various desirable properties.

The amount of the surface-modified antimony compound incorporated into the organic resins and elastomers can vary over a wide range depending upon the type of resin and the other ingredients of the resin or elastomer. Generally, amounts up to about 15% by weight of the surface-modified antimony compounds can be incorporated into the organic resin or elastomer.

The following examples illustrate resin and elastomer systems containing the treated antimony compounds of the invention:

|  | Parts By Weight |
|---|---|
| Example A | |
| Polyester resin "Paraplex" P-43 (available from Rohm & Haas) catalyzed with 1% "Luperco" ATC, an organic peroxide from Wallace and Tierman, Inc., Lucidol Division | 100 |
| Product of Example 1 | 10 |
| Halogen-containing flame retardant | 10 |
| Example B | |
| "Paraplex" P-43 catalyzed with 1% "Luperco" ATC | 100 |
| Product of Example 2 | 10 |
| Halogen-containing flame retardant | 10 |
| Example C | |
| Polypropylene resin 5524-1 (from Shell Chemical Co.) | 100 |
| Clay | 40 |
| Product of Example 3 | 10 |
| Halogen-containing flame retardant | 8 |

The embodiments of the invention in which an exclusive property or privilege is claimed are defined as follows:

1. A finely divided particulate inorganic antimony compound surface modified with an organic titanate having the general formula $$Ti(OR)_4 \qquad \text{(FORMULA I)}$$

wherein each R is independently an alkyl, aryl, cycloalkyl, or vinyl group containing from one to about 18 carbon atoms, or $$Ti(OR')_2(OYX)_2 \qquad \text{(FORMULA II)}$$

wherein X is oxygen or nitrogen,
Y is a two- or three-carbon atom chain, and
R' is equal to R, H, or the ligand represented by XYOH.

2. The compound of claim 1 wherein the antimony compound is surface modified with up to about 10% by weight of the titanate.

3. The compound of claim 1 wherein the antimony compound is an antimony oxide, antimony oxychloride, or a metal antimonate.

4. The compound of claim 1 wherein Y contains from about two to about ten carbon atoms.

5. The compound of claim 1 wherein the titanate has a general formula $$Ti(OR)_4 \qquad \text{(FORMULA I)}$$

wherein each R is independently an alkyl group containing from one to about 18 carbon atoms.

6. The compound of claim 1 wherein the antimony compound is an antimony sulfide.

7. The compound of claim 3 wherein the antimony oxide is antimony trioxide or antimony pentoxide.

8. A method of improving the flame-retardant properties of organic resins and elastomers comprising incorporating into said resin or elastomer, an amount of the surface-modified antimony compound of claim 1 which is effective to improve the flame-retardant properties.

9. The method of claim 8 wherein the resin is a thermoplastic resin.

10. The method of claim 8 wherein up to about 15% by weight of the surface-modified antimony compound is incorporated into the resin or elastomer.

11. The method of claim 8 wherein the inorganic antimony compound is an antimony oxide.

12. An organic resin or elastomer containing an amount of the surface-modified antimony compound of claim 1 which is effective to improve the flame-retardant properties of the resin or elastomer.

13. The resin or elastomer of claim 12 containing up to about 15% by weight of the surface-modified antimony compound of claim 1.

* * * * *